(12) United States Patent
Hasegawa et al.

(10) Patent No.: US 8,960,428 B2
(45) Date of Patent: Feb. 24, 2015

(54) OPTICAL FIBER CUTTER STORAGE CASE

(75) Inventors: Masahiro Hasegawa, Yokohama (JP);
Kiyoshi Nakazawa, Yokohama (JP);
Toshihiko Homma, Yokohama (JP)

(73) Assignees: SEI Optifrontier Co., Ltd., Yokohama (JP); Sumitomo Electric Industries, Ltd., Osaka (JP)

( * ) Notice: Subject to any disclaimer, the term of this patent is extended or adjusted under 35 U.S.C. 154(b) by 194 days.

(21) Appl. No.: 13/698,456

(22) PCT Filed: Jun. 8, 2011

(86) PCT No.: PCT/JP2011/063096
§ 371 (c)(1),
(2), (4) Date: Nov. 16, 2012

(87) PCT Pub. No.: WO2011/158705
PCT Pub. Date: Dec. 22, 2011

(65) Prior Publication Data
US 2013/0056376 A1    Mar. 7, 2013

(30) Foreign Application Priority Data

Jun. 17, 2010  (JP) ................................ 2010-138374

(51) Int. Cl.
*A45C 11/26*    (2006.01)
*G02B 6/25*    (2006.01)

(52) U.S. Cl.
CPC ...................................... *G02B 6/25* (2013.01)
USPC ....................................................... 206/349

(58) Field of Classification Search
USPC ........... 206/349, 377, 230, 565, 521; 81/3.31; 385/135, 137
See application file for complete search history.

(56) References Cited

U.S. PATENT DOCUMENTS

| 4,164,309 | A  | * | 8/1979  | Staats ........................... 206/425 |
| 5,797,488 | A  | * | 8/1998  | Yemini ......................... 206/349 |
| 7,108,131 | B2 | * | 9/2006  | Dreher et al. ................. 206/349 |
| 7,305,169 | B2 | * | 12/2007 | Homma ......................... 385/136 |

(Continued)

FOREIGN PATENT DOCUMENTS

| CN | 2938147 Y   | 8/2007 |
| CN | 201233458 Y | 5/2009 |

(Continued)

OTHER PUBLICATIONS

Handy Hikari Fiber Cutter FC-7 Catalog, Sumitomo Electric Industries, Ltd., May 2005.

*Primary Examiner* — Luan K Bui
*Assistant Examiner* — Rafael Ortiz
(74) *Attorney, Agent, or Firm* — Global IP Counselors, LLP

(57) ABSTRACT

A case for accommodating a fiber cleaver is capable of preventing the fiber cleaver from being damaged. The case accommodating a fiber cleaver includes a base and a lid such that the lid is openably and closably provided for the base in an integrated fashion. The base of the case has therein a positioning space for the cleaver on its inner bottom surface, the positioning space positioning a main body included in a cleaver unit. Latches protruding inwardly in the base of the case are arranged on positioning walls defining part of the positioning space for the cleaver. The latches have a function of retaining a support of the main body of the cleaver in a direction along the height of the base of the case. The latch further has a function of retaining a slider included in the cleaver unit in a sliding direction.

6 Claims, 8 Drawing Sheets

(56) References Cited

U.S. PATENT DOCUMENTS

| | | |
|---|---|---|
| 7,391,951 B2 | 6/2008 | Hayashi et al. |
| 7,787,739 B2 * | 8/2010 | Munn .......................... 385/137 |
| 2006/0032765 A1 * | 2/2006 | Morhard et al. ............. 206/278 |
| 2007/0017837 A1 * | 1/2007 | McCambridge et al. ..... 206/373 |

FOREIGN PATENT DOCUMENTS

| | | |
|---|---|---|
| JP | 2001-356216 A | 12/2001 |
| JP | 2009-003407 A | 1/2009 |
| JP | 2009-244403 A | 10/2009 |
| JP | 2010-039002 A | 2/2010 |

\* cited by examiner

OPTICAL FIBER CUTTER STORAGE CASE

CROSS-REFERENCE TO RELATED APPLICATIONS

This U.S. National stage application claims priority under 35 U.S.C. §119(a) to Japanese Patent Application No. 2010-138374, filed in Japan on Jun. 17, 2010, the entire contents of which are hereby incorporated herein by reference.

TECHNICAL FIELD

The present invention relates to a case for accommodating a fiber cleaver.

BACKGROUND ART

A discloses a fiber cleaver that includes a plurality of clamps arranged on a main body and a cover and configured to hold a fiber at two points in the longitudinal direction of the fiber, a sliding member including a disk-shaped blade for making a score on the fiber and configured to move in a direction intersecting the longitudinal direction of the fiber, and a pressing member, disposed on the opposite side of the fiber from the score, for pressing the scored fiber to cut the fiber.

From the viewpoint of protecting a fiber cleaver, it is preferable that the fiber cleaver should be accommodated in a case while the fiber cleaver is not in use. There have, however, been few special cases to accommodate a fiber cleaver. If a fiber cleaver is accommodated in a general purpose case which is not intended to accommodate a fiber cleaver, the fiber cleaver will move inside the case such that the fiber cleaver hits against inner walls of the case while being carried. Disadvantageously, the fiber cleaver may be damaged.

SUMMARY OF INVENTION

Technical Problem

An object of the present invention is to provide an accommodating case capable of preventing a fiber cleaver from being damaged.

Solution to Problem

The present invention provides a case for accommodating a fiber cleaver that includes a main body and a slider attached to the main body, the slider being provided with a blade for scoring the fiber, the case including a base having one or a plurality of positioning walls and a positioning space for the cleaver, the positioning space positioning the main body of the cleaver, wherein the one or one of the plurality of positioning walls is provided with a first latch that protrudes inwardly in the base of the case, the first latch retaining the slider in a sliding direction.

A plurality of positioning walls as the one or plurality of positioning walls may be provided on the same side of the base of the case. Each of the plurality of positioning walls may be provided with a second latch that protrudes inwardly in the base of the case, the second latch retaining the main body of the cleaver in a direction along the height of the base of the case. One of the plurality of second latches may function as the first latch. In this case, preferably, a slant portion is positioned on each second latch such that the slant portion slants downwardly and inwardly in the base of the case.

The fiber cleaver may include a cover that is openable and closable relative to the main body. A lid of the case may be openably and closably connected to the base of the case. The lid of the case may include a hold-down portion that holds down the cover of the cleaver. In this case, preferably, each of the base and the lid of the case has a recessed portion at its distal end, the recessed portion of the lid of the case is provided with a hook for fastening the base and the lid of the case in a closed state, and the recessed portion of the base of the case includes a hook receiving portion to be engaged with the hook.

Furthermore, preferably, the lid of the case is made of a transparent material. Preferably, the base of the case contains an antistatic agent.

Advantageous Effects of Invention

According to the present invention, a fiber cleaver can be prevented from being damaged.

DESCRIPTION OF EMBODIMENTS

Figure 1:
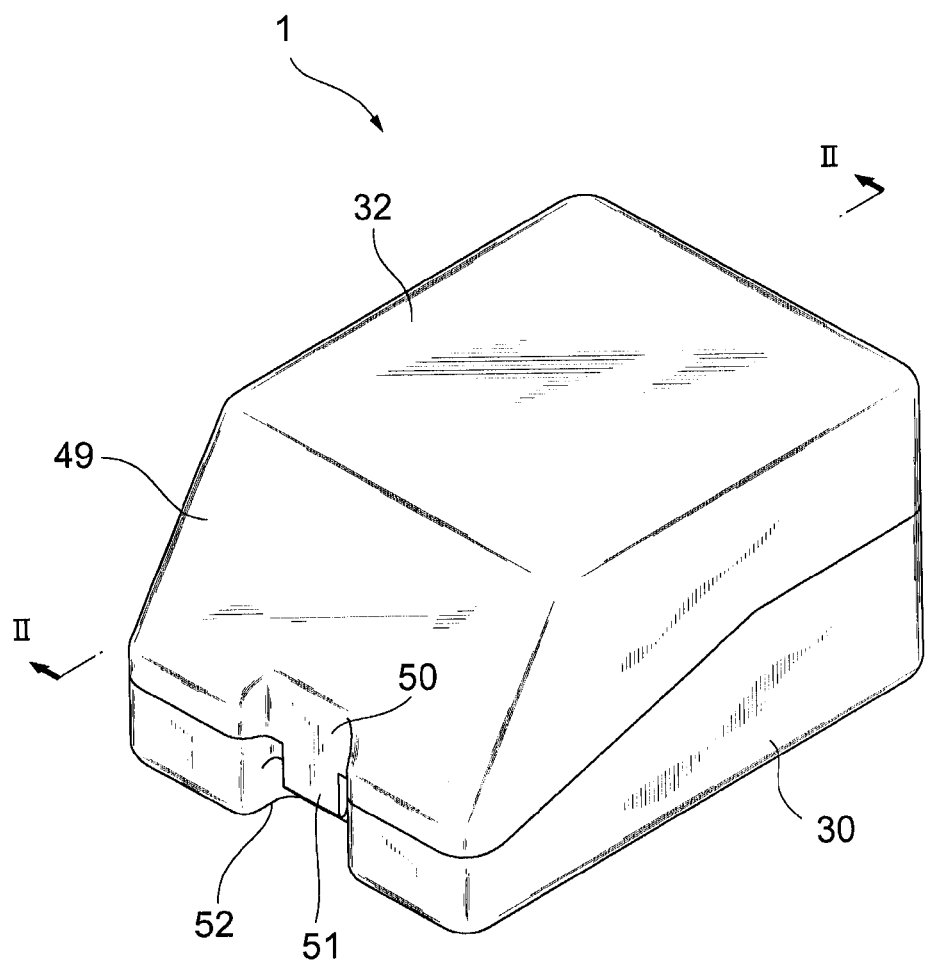
FIG. 1 is a perspective view of the appearance of a case for accommodating a fiber cleaver according to an embodiment of the present invention.

Embodiments of the present invention will be described below with reference to the drawings. The drawings are intended for explanation only and are not intended to limit the scope of the invention. The identical reference numerals indicate the same components in the drawings to avoid redundant description. The ratios of dimensions in the drawings are not necessarily exact.

Figure 6:
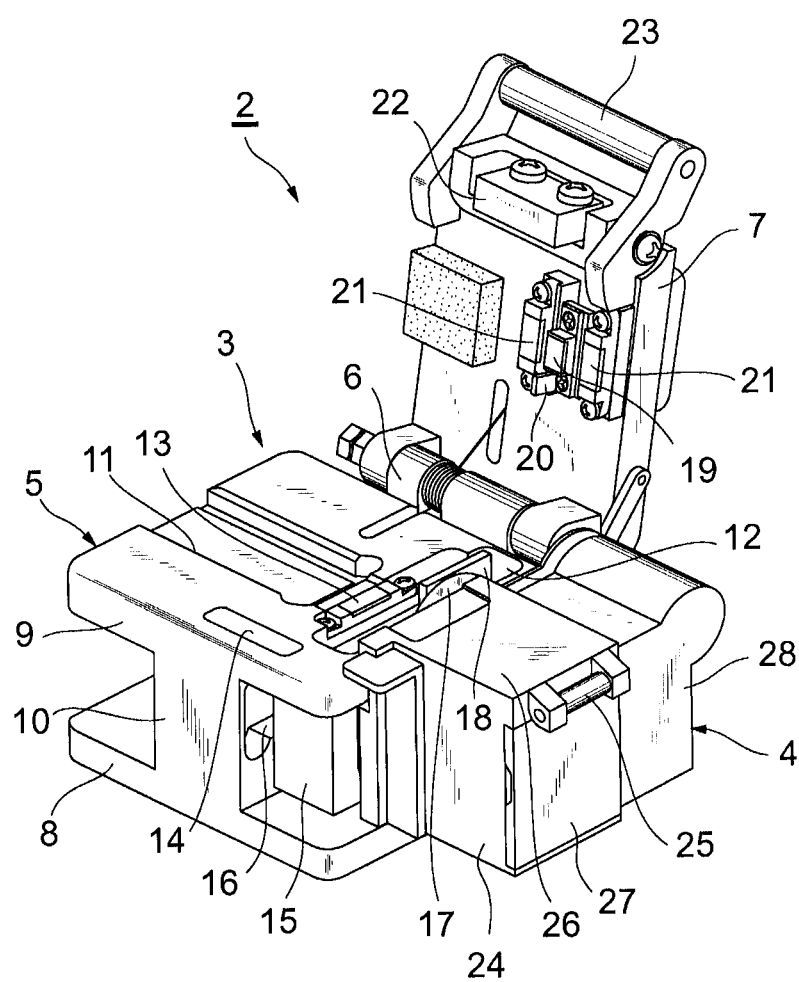
FIG. 6 is a perspective view of an example of a fiber cleaver to be accommodated in the case according to the present invention.

FIG. 6 is a perspective view of an example of a fiber cleaver to be accommodated in a case according to the present invention. The fiber cleaver, 2, includes a cleaver unit 3 that cuts a fiber and a chip collecting unit 4 that collects a chip (cut end of the fiber) removed from the fiber cut with the cleaver unit 3.

The cleaver unit 3 includes a main body 5 of the cleaver and a cover 7 openably and closably connected to the main body 5 of the cleaver with a shaft 6, the main body 5 of the cleaver having a substantially I-shaped cross-section. The main body 5 of the cleaver includes a support 8, a mount 9 positioned above the support 8, and a connecting portion 10 connecting the support 8 and the mount 9. The chip collecting unit 4 is detachably attached to one side surface of the support 8 by a screw.

The mount 9 has an upper surface provided with a holder guide 11, serving as a substantially rectangular recess, for positioning a fiber holder (not illustrated) holding the fiber to be cut. An opening 12 is positioned next to the holder guide 11 in the mount 9, the opening 12 extending in a front-to-rear direction of the main body 5 of the cleaver (i.e., a direction orthogonal to the fiber placed on the mount 9, the front being a side on which a control lever 23 is positioned, the rear being a side on which the shaft 6 is positioned, when the cover 7 is closed). In addition, a pair of lower rubber-covered clamps 13 are screwed on the upper surface of the mount 9 such that the clamps sandwich the opening 12. Furthermore, a magnet receiving portion 14 is disposed in front end part of the upper surface of the mount 9.

The main body 5 of the cleaver is provided with a slider 15 which is slidable forward and rearward. The slider 15 is positioned in a space which is defined between the support 8 and the mount 9 and is adjacent to the chip collecting unit 4. The slider 15 is slidable forward and rearward along a linear guide 16 disposed on one side surface of the connecting portion 10.

A disk-shaped blade 17 for scoring the fiber is attached to the slider 15 such that the blade 17 upwardly projects from the opening 12. A protrusion 18 is disposed next to the blade 17 on the slider 15 such that the protrusion 18 upwardly protrudes from the opening 12.

The cover 7 has a rear surface on which a rubber-covered anvil 19 for bending the fiber scored by the blade 17 to cut the fiber is screwed. The anvil 19 is biased toward the main body 5 of the cleaver by a compression spring (not illustrated). The anvil 19 is provided with an engaging member 20, which is to be engaged with the protrusion 18 when the cover 7 is closed relative to the main body 5 of the cleaver.

In addition, a pair of upper rubber-covered clamps 21 are screwed on the rear surface of the cover 7 such that the upper clamps 21 sandwich the anvil 19. Each upper clamp 21 cooperates with the corresponding lower clamp 13 in clamping the fiber placed on the mount 9. A magnet 22 and the control lever 23 are screwed in distal end part (front end part) of the rear surface of the cover 7, the magnet 22 being to be attracted to the magnet receiving portion 14.

The chip collecting unit 4 includes an outer case 24, a lid 26 openably and closably connected to the outer case 24 with a shaft 25, an inner case 27, accommodated in the outer case 24, for storing chips of the fiber, and a case 28 accommodating transmitting mechanisms, the case 28 being placed next to the outer case 24. The outer case 24 accommodates a lower roller (not illustrated) and the lid 26 has a rear surface provided with an upper roller (not illustrated). When the lid 26 is closed relative to the outer case 24, a chip of the fiber is nipped between the lower roller and the upper roller.

The case 28 accommodates a transmitting mechanism for drivingly connecting the lid 26 to the slider 15 such that the slider 15 is slid in response to closing of the lid 26 and a transmitting mechanism for drivingly connecting the lower roller in the outer case 24 to the clamps 13 and 21 such that the lower roller is rotated in response to releasing of the clamps. Specifically, since a pivot lever (not illustrated) projects from an upper end of the outer case 24 before the slider 15 is slid rearward, the lid 26 is caught by the pivot lever such that the lid 26 is not fully closed. When the slider 15 is slid rearward, the pivot lever pivots such that the pivot lever moves downward below the upper end of the outer case 24, so that the lid 26 is fully closed. When the clamps 13 and 21 are released by opening the cover 7 relative to the main body 5 of the cleaver, the lower roller is rotated.

To cut the fiber using the fiber cleaver 2, the fiber is held by the fiber holder (not illustrated) and the fiber holder is placed in the holder guide 11 while the cover 7 is being opened. The cover 7 is then closed while the slider 15 is positioned in the front of the main body 5 of the cleaver. Consequently, the fiber is clamped by the clamps 13 and 21. In addition, the engaging member 20 attached to the cover 7 is brought into contact with the protrusion 18 on the slider 15, so that the anvil 19 is held against the biasing force of the compression spring.

Additionally, the lid 26 of the chip collecting unit 4 is closed. Since the slider 15 is positioned in the front of the main body 5 of the cleaver at this time, the lid 26 is caught by the pivot lever as described above such that the lid 26 is slightly opened. Accordingly, a distal end of the fiber is not nipped between the above-described upper and lower rollers before the fiber is cut, thus preventing a tension applied to the fiber from becoming unstable.

Subsequently, the slider 15 is slid rearward relative to the main body 5 of the cleaver. Consequently, the blade 17 is brought into contact with the fiber, so that the fiber is scored.

When the slider 15 is further slid rearward, the protrusion 18 passes the engaging member 20, so that the anvil 19 is moved downward by the biasing force of the compression spring, so that the anvil 19 abuts against the fiber. Thus, the anvil 19 bends the fiber. Since parts adjacent to the distal and proximal ends of the fiber are held by the clamps 13 and 21 at this time, a tension is applied to the fiber. Consequently, the fiber is broken at the score, serving as a start point, on the fiber.

When the slider 15 is further slid rearward, the pivot lever pivots as described above, so that the lid 26 is fully closed. At this time, a chip of the fiber is nipped between the upper and lower rollers.

Subsequently, the cover 7 of the cleaver unit 3 is opened. The lower roller is therefore rotated, so that the chip of the fiber falls into the inner case 27.

Figure 2:
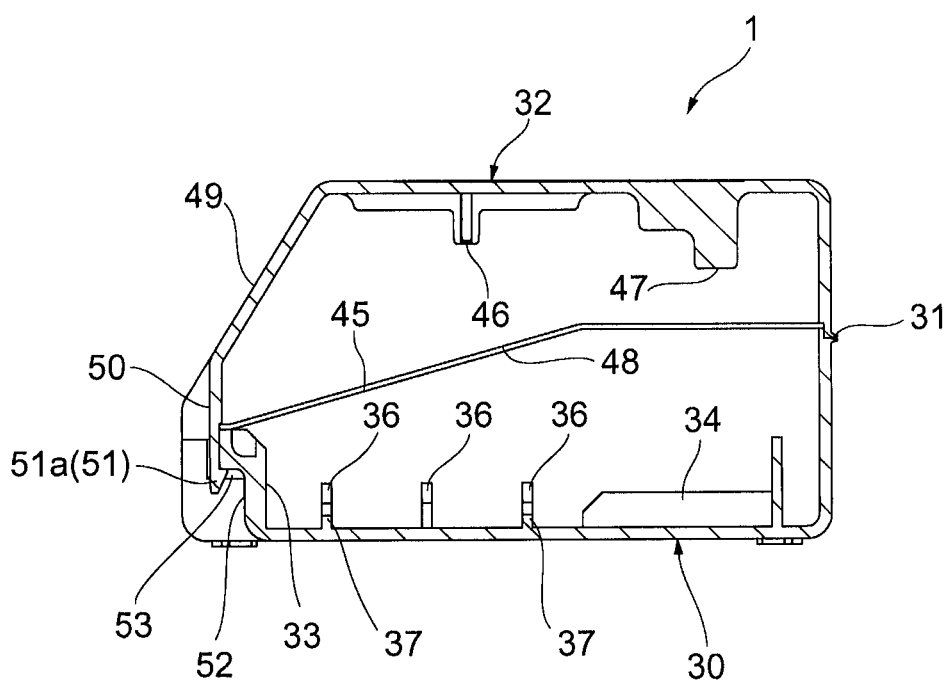
FIG. 2 is a sectional view of the case taken along line II-II in FIG. 1.
Figure 3:
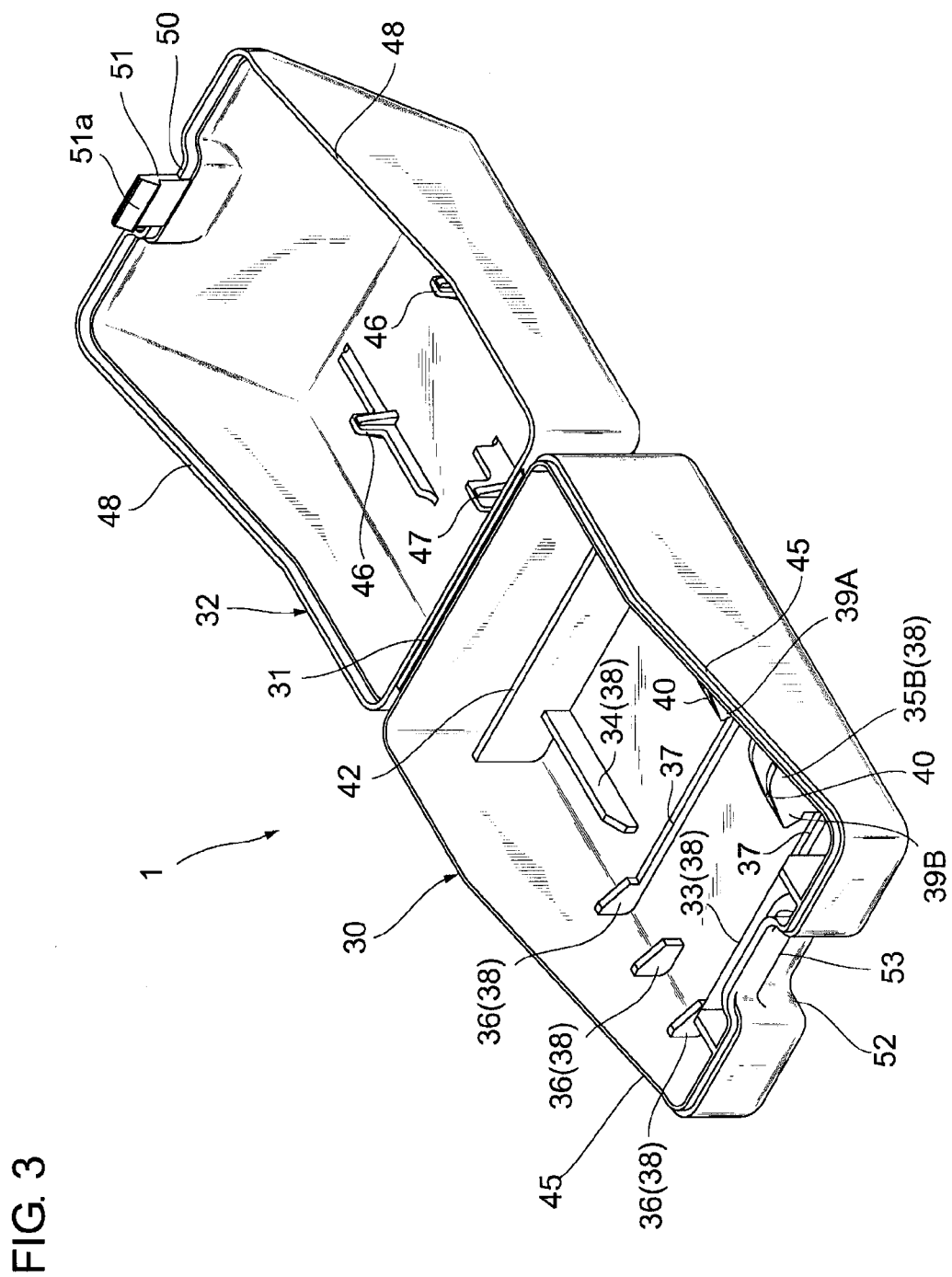
FIG. 3 is a perspective view of the case of FIG. 1 in an opened state.
Figure 4:
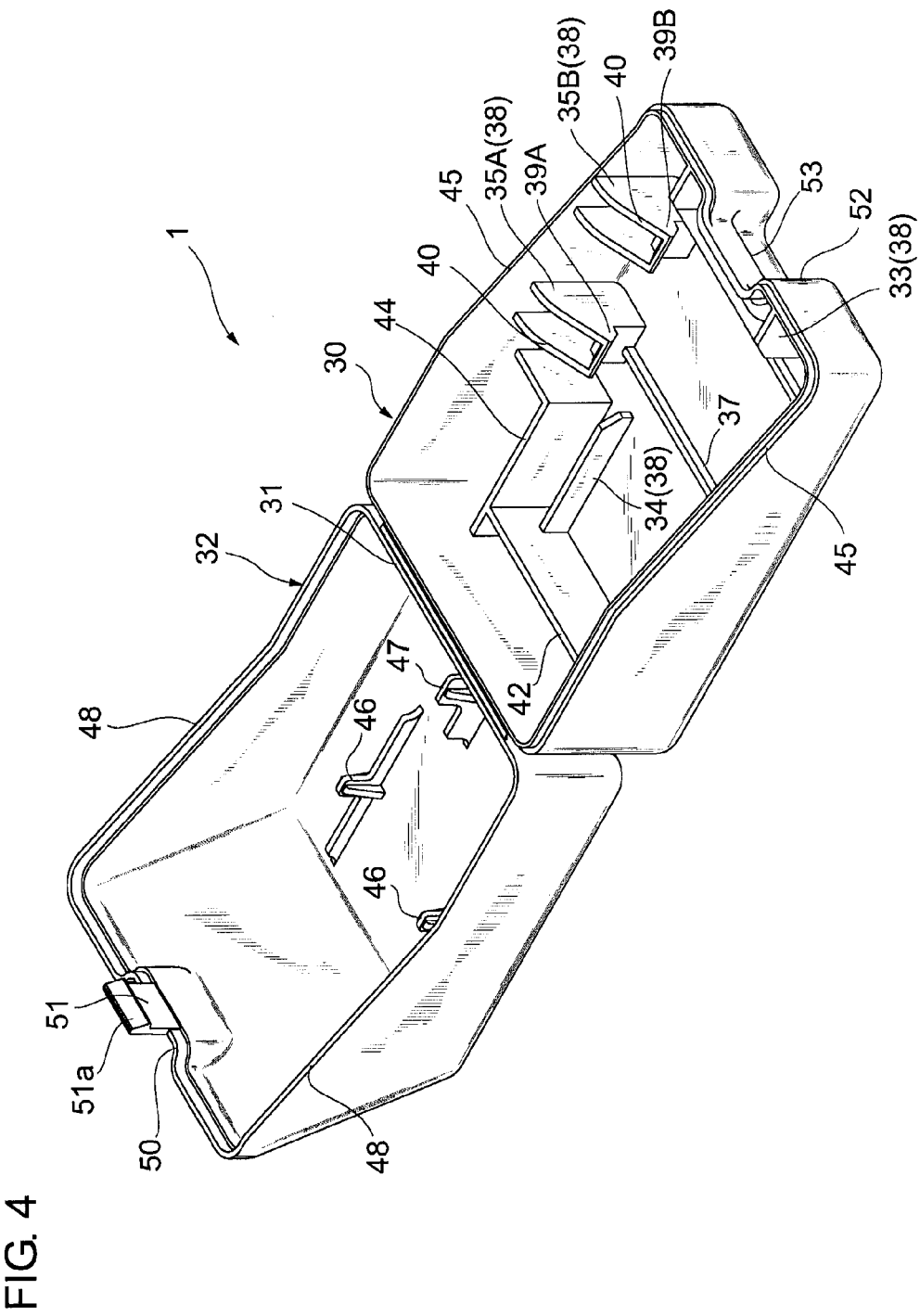
FIG. 4 is a perspective view of the case of FIG. 1 in the opened state.
Figure 5:
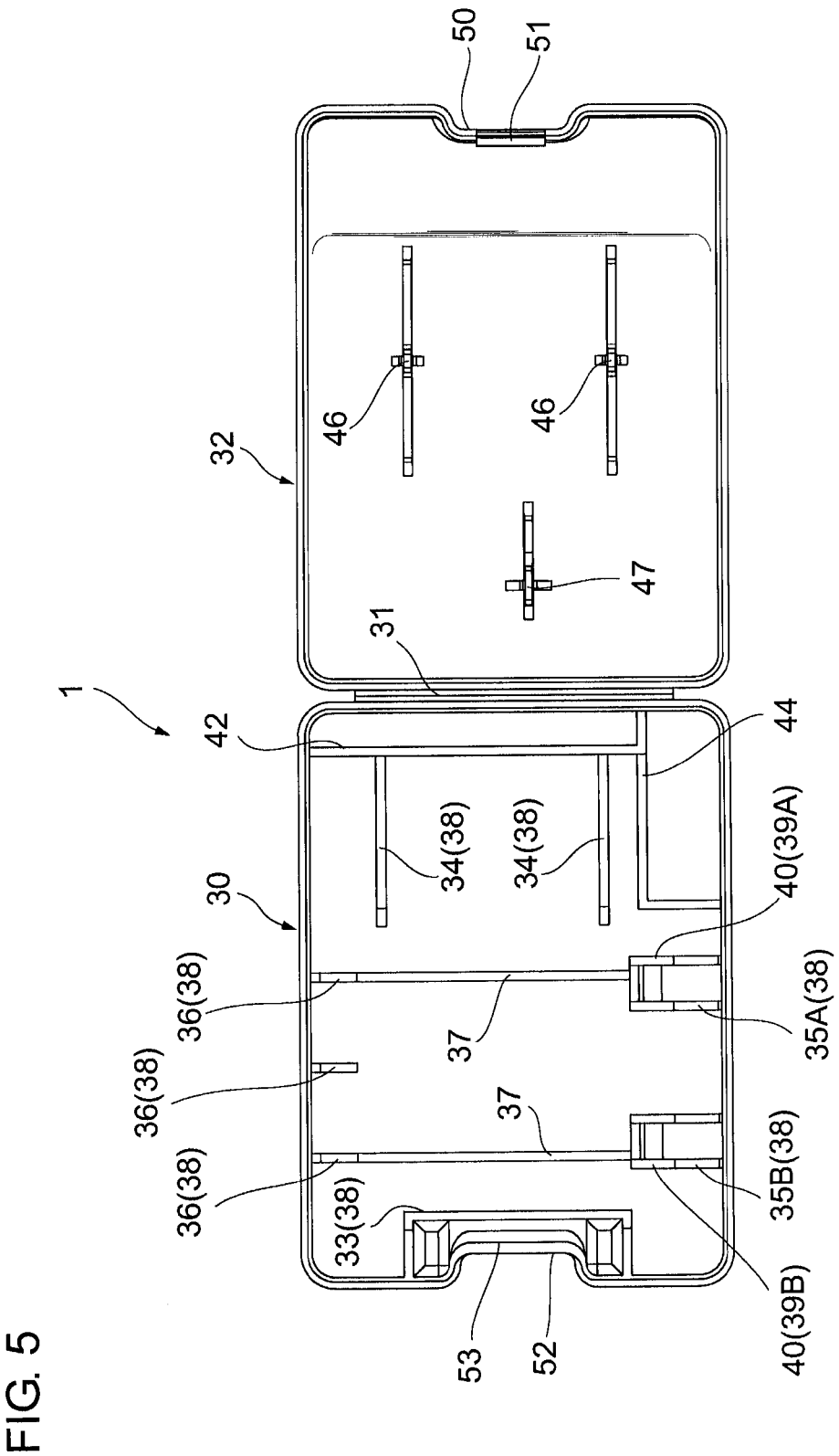
FIG. 5 is a plan view of the case of FIG. 1 in the opened state.

FIG. 1 is a perspective view of a case 1, accommodating the fiber cleaver, according to an embodiment of the present invention. FIG. 2 is a sectional view of the case 1 taken along line II-II. FIGS. 3 and 4 are perspective views of the case 1 in an opened state. FIG. 5 is a plan view thereof in the same state. The case 1 is a dedicated case to accommodate the fiber cleaver 2. The case 1 includes a base 30 and a lid 32. The base 30 of the case is substantially rectangular in cross section. The lid 32 of the case is connected to the base 30 of the case with a hinge 31 in an integrated fashion and is openable and closable relative to the base 30.

The base 30 of the case has therein a positioning wall 33 in its distal end part (front end part). The base 30 of the case has therein two positioning protrusions 34 on its bottom surface such that the protrusions are arranged adjacent to its proximal end (rear end), the positioning protrusions 34 extending in a direction along the length of the base 30 of the case. The base 30 of the case has therein positioning walls 35A and 35B on one side such that the positioning walls 35A and 35B are arranged in a region between the positioning wall 33 and the positioning protrusions 34. The base 30 of the case has therein three positioning protrusions 36 on the other side such that the positioning protrusions 36 face the positioning walls 35A and 35B. Additionally, the base 30 of the case has therein connecting protrusions 37 on the bottom surface such that the connecting protrusions 37 connect the positioning walls 35A and 35B to two outer positioning protrusions 36 of the three positioning protrusions 36.

Figure 7:
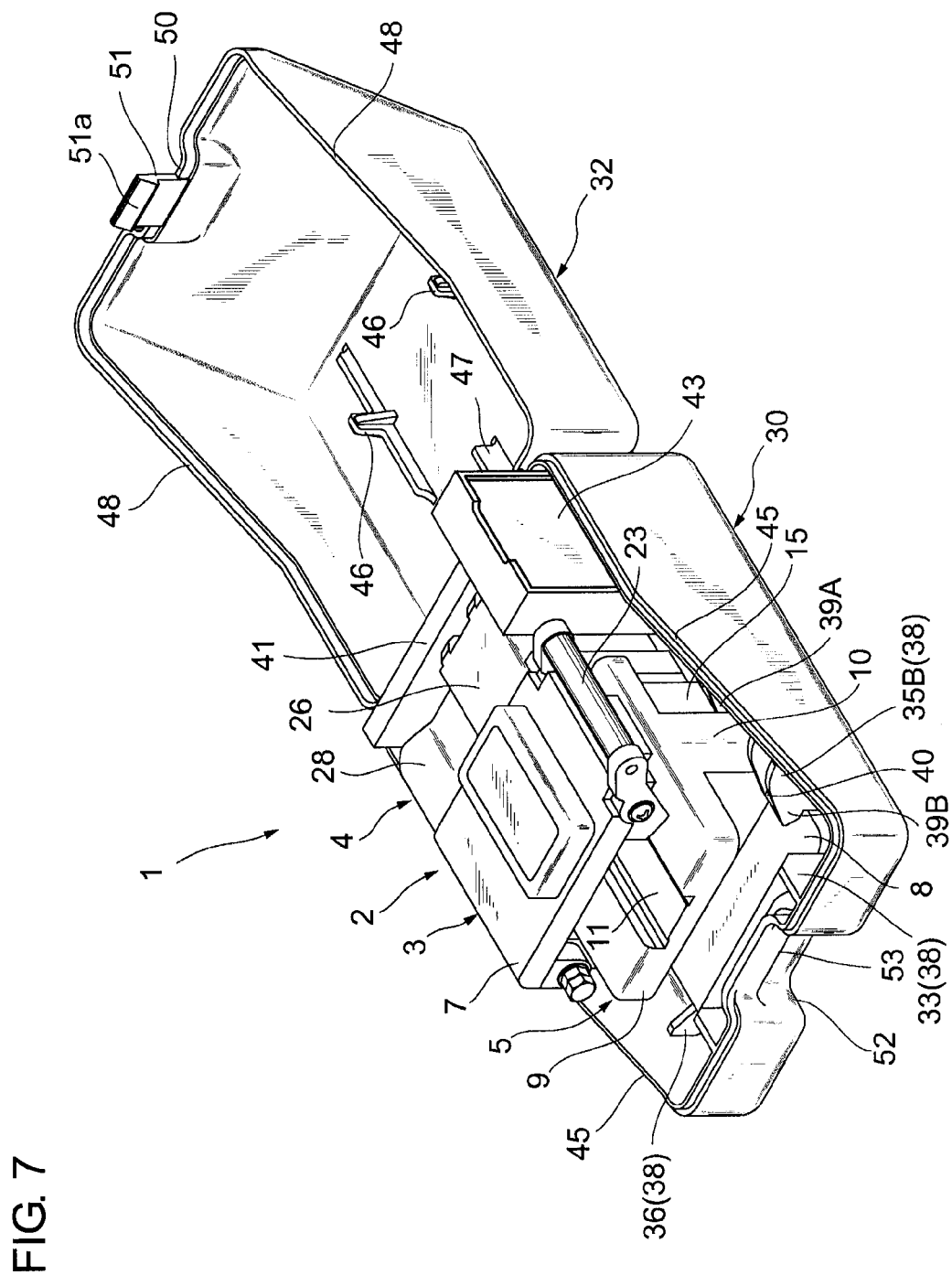
FIG. 7 is a perspective view of the case of FIG. 1 in a state in which the case accommodates the fiber cleaver.
Figure 8:
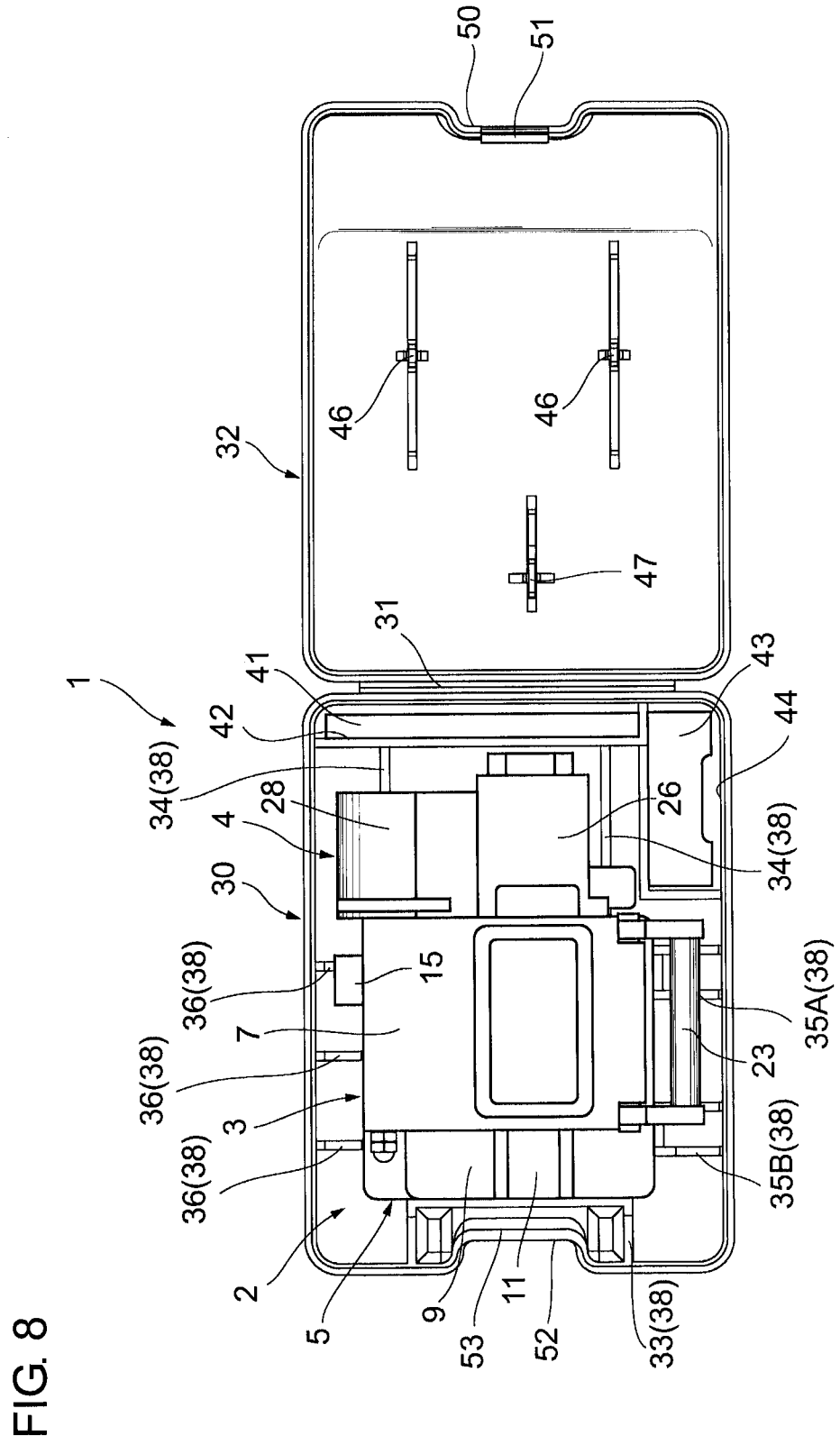
FIG. 8 is a plan view of the case of FIG. 1 in the state in which the case accommodates the fiber cleaver.

The positioning walls 33, 35A, and 35B and the positioning protrusions 34 and 36 define a positioning space 38 for the cleaver as illustrated in FIGS. 7 and 8, the positioning space 38 positioning the main body 5 of the fiber cleaver 2. The cleaver unit 3 is received in the positioning space 38 for the cleaver such that the front end of the cleaver unit 3 is positioned at the positioning walls 35A and 35B. The positioning space 38 for the cleaver is designed such that the cleaver unit 3 oriented in a direction different from a predetermined direction cannot be received in this space.

While the cleaver unit 3 is received in the positioning space 38 for the cleaver, the cleaver unit 3 is retained relative to the base 30 of the case in the direction along the length of the base 30 of the case and a direction along the width thereof. In this case, the cleaver unit 3 is placed on the connecting protrusions 37. In the case where the chip collecting unit 4 is attached to the cleaver unit 3, the chip collecting unit 4 is placed on the positioning protrusions 34.

The positioning walls 35A and 35B are provided with latches 39A and 39B, respectively, such that the latches 39A and 39B protrude inwardly in the base 30 of the case. The latches 39A and 39B function as second latches retaining the support 8 of the main body 5 of the cleaver positioned in the positioning space 38 for the cleaver in a direction along the height of the base 30 of the case.

The latch 39A, positioned adjacent to the positioning protrusions 34, further functions as a first latch retaining the slider 15 of the cleaver unit 3 received in the positioning space 38 for the cleaver in a sliding direction of the slider 15. Specifically, when the cleaver unit 3 is received in the positioning space 38 for the cleaver in the base 30 of the case while the slider 15 is positioned in the front of the main body 5 of the cleaver, the latch 39A presses the slider 15 against the corresponding positioning protrusion 36 to retain the slider 15. Since at least one of the plurality of second latches functions as the first latch as described above, the number of protrusions does not have to be increased to more than required. Advantageously, the structure of the base of the case is prevented from being complicated.

Slant portions 40 are arranged on the latches 39A and 39B, respectively, such that the slant portions 40 extending continuously from upper ends of the positioning walls 35A and 35B slant downwardly and inwardly in the base 30 of the case. The angle between each slant portion 40 and the inner bottom surface of the base 30 of the case is, for example, approximately 45 degrees. Since the above-described slant portions 40 are arranged on the latches 39A and 39B, the cleaver unit 3 may be downwardly slid from an upper side of the base 30 of the case on the slant portions 40 arranged on the latches 39A and 39B in order to receive the cleaver unit 3 in the positioning space 38 for the cleaver. Advantageously, an operation of receiving the main body of the cleaver in the positioning space for the cleaver can be easily performed.

The base 30 of the case has therein an instruction manual receiving portion 42 in the proximal end, the instruction manual receiving portion 42 receiving an instruction manual 41 (refer to FIGS. 7 and 8). Additionally, the base 30 of the case has therein a spare blade receiving portion 44 positioned adjacent to the proximal end such that the spare blade receiving portion 44 is next to the positioning wall 35A, the spare blade receiving portion 44 receiving a spare blade case 43 accommodating a spare blade.

The base 30 of the case has a slant portion 45 which downwardly slants to the distal end. The height of a distal end surface of the base 30 of the case is therefore lower than that of a proximal end surface thereof. Accordingly, the cleaver unit 3 received in the positioning space 38 for the cleaver in the base 30 of the case is easily removed from the base 30 of the case.

The lid 32 of the case includes two hold-down protrusions 46 and a hold-down protrusion 47 on its rear surface, the hold-down protrusions 46 holding down the cover 7 of the cleaver unit 3 received in the positioning space 38 for the cleaver in the base 30 of the case, the hold-down protrusion 47 holding down the lid 26 of the chip collecting unit 4 attached to the cleaver unit 3. This arrangement prevents the cover 7 of the cleaver unit 3 and the lid 26 of the chip collecting unit 4 from being opened within the case 1 accommodating the fiber cleaver when the lid 32 of the case is closed while the cleaver unit 3 with the chip collecting unit 4 is received in the positioning space 38 for the cleaver in the base 30 of the case.

The lid 32 of the case has a slant portion 48 which slants to its distal end so as to fit the slant portion 45 of the base 30 of the case. The thickness of a distal end surface of the lid 32 of the case is therefore greater than that of a proximal end surface thereof. Furthermore, the distal end surface of the lid 32 of the case includes a slant area 49.

The lid 32 of the case has a recessed portion 50 at the middle of its outer distal end surface. The recessed portion 50 is provided with a hook 51 on its bottom surface, the hook 51 fastening the base 30 and the lid 32 of the case when the base 30 and the lid 32 are closed as illustrated in FIG. 1. The hook 51 includes a catching projection 51a at its free end. The base 30 of the case has a recessed portion 52 at the middle of its outer distal end surface. The recessed portion 52 includes a hook receiving ledge 53 on its bottom surface at the middle thereof, the hook receiving ledge 53 being to be engaged with the catching projection 51a.

As described above, the recessed portion 50 of the lid 32 of the case is provided with the hook 51 and the recessed portion 52 of the base 30 of the case includes the hook receiving ledge 53. Accordingly, the hook 51 is positioned inward from the distal end surface of the lid 32 of the case. It is therefore difficult to hold the hook 51 by hand while the base 30 and the lid 32 of the case are closed. Additionally, the hook 51 does not tend to hit against another object. Thus, the hook 51 is prevented from being broken or damaged.

The above-described case 1, accommodating the fiber cleaver, comprises resin containing an antistatic agent. Specifically, the material of the case 1 is, for example, polypropylene (PP) containing an antistatic agent. Since the case 1 comprises resin containing an antistatic agent, a chip of the fiber will not tend to be attracted to the case 1 by static electricity if chips are removed from the fiber upon cutting the fiber with the fiber cleaver 2. Accordingly, the case 1 can be easily cleaned.

Preferably, the base 30 of the case is colored in black. If a fiber falls into the base 30 of the case, the fiber can be therefore easily found. Furthermore, preferably, the lid 32 of the case is transparent or translucent. Accordingly, the interior of the case 1 accommodating the fiber cleaver can be seen while the base 30 and the lid 32 of the case are closed. Furthermore, the lid 32 of the case may be colored in black similar to the base 30 of the case.

As described above, since the positioning space 38 for the cleaver is placed in the base 30 of the case 1 accommodating the fiber cleaver, the main body 5 of the cleaver is retained relative to the base 30 of the case in the direction along the length of the base 30 of the case and the direction along the width thereof as illustrated in FIGS. 7 and 8. Additionally, since the positioning walls 35A and 35B defining part of the positioning space 38 for the cleaver are provided with the latches 39A and 39B, respectively, the latches 39A and 39B retain the main body 5 of the cleaver relative to the base 30 of the case in a direction along the height of the base 30 of the case. Furthermore, the latch 39A retains the slider 15 of the cleaver unit 3 relative to the base 30 of the case in the sliding direction of the slider 15.

As described above, in the case accommodating the fiber cleaver according to the present invention, when the fiber cleaver is accommodated, the main body of the cleaver is positioned in the positioning space for the cleaver in the base of the case, so that the main body of the cleaver is prevented from moving relative to the base of the case. In addition, since the first latch for retaining the slider in the sliding direction is provided for the positioning wall defining part of the positioning space for the cleaver, the slider is also prevented from moving relative to the base of the case while the fiber cleaver is accommodated. The above-described arrangement prevents the main body of the cleaver and the slider from being damaged.

Additionally, since the hold-down protrusions 46 and 47 are arranged on the rear surface of the lid 32 of the case, the lid 32 of the case holds down the cover 7 of the cleaver unit 3 and the lid 26 of the chip collecting unit 4 when being closed relative to the base 30 of the case.

As described above, the main body 5 of the cleaver, the cover 7, the slider 15, and the lid 26 of the chip collecting unit 4 in the cleaver unit 3 are prevented from moving within the case 1, for example, while the case 1 accommodating the fiber cleaver 2 is carried, thus avoiding a problem in that the main body 5 of the cleaver, the cover 7, the slider 15, and the lid 26 hit against the inner walls of the case 1 and are broken. The fiber cleaver 2 can therefore be sufficiently protected by the case 1 accommodating the fiber cleaver.

In addition, when the cleaver unit 3 is received in the positioning space 38 for the cleaver in the base 30 of the case, the latch 39A presses the slider 15 to the corresponding positioning protrusion 36, so that the lid 26 of the chip collecting unit 4 is fully closed relative to the outer case 24 as described above. While the fiber cleaver 2 is accommodated in the case 1, therefore, the base 30 and the lid 32 of the case can be surely closed.

Note that the present invention is not limited to the above-described embodiment. The present invention is applicable to, for example, a case for accommodating a fiber cleaver excluding a chip collecting unit.

CITATION LIST

Patent Literature

PTL 1: Japanese Unexamined Patent Application Publication No. 2009-244403

The invention claimed is:

1. A case comprising:
a base having a bottom wall, a first side wall and a second side wall, at least the bottom wall being provided with a plurality of positioning walls formed therewith that extend upward from the bottom wall between the first and second side walls defining a positioning space, the first side wall having a hinge and the second side wall being opposite the first side wall;
a lid pivotally supported on the base via the hinge, the lid having a top wall with a plurality of hold-down protrusions on an inner surface thereof;
a fiber cleaver having a main body and a slider attached to the main body, the fiber cleaver being removably positioned on the positioning walls spaced apart from the bottom wall, the first side wall and the second side wall within the positioning space, and with the lid in a closed position covering the fiber cleaver, the plurality of hold-down protrusions contact an upper surface of the fiber cleaver retaining the fiber cleaver in position between the base and the lid, the fiber cleaver being spaced apart from the top wall of the lid with the lid in the closed position, and
wherein one of the plurality of positioning walls of the base is provided with a first latch that protrudes inwardly in the base, the first latch retaining the slider in a sliding direction.

2. The case according to claim 1, wherein
at least one of the plurality of positioning walls is provided with a second latch that protrudes inwardly in the base, the second latch retaining the main body of the cleaver in a direction along the height of the base of the case.

3. The case according to claim 2, wherein
a slant portion is positioned on the second latch such that the slant portion slants downwardly and inwardly in the base of the case.

4. The case according to claim 1, wherein
each of the base and the lid of the case has a recessed portion at its distal end opposite the hinge, the recessed portion of the lid of the case is provided with a hook for fastening the base and the lid of the case in a closed state, and the recessed portion of the base of the case includes a hook receiving portion to be engaged with the hook.

5. The case according to claim 1,
wherein the lid of the case comprises a transparent material.

6. The case according to claim 1,
wherein the base of the case contains an antistatic agent.

* * * * *